(12) United States Patent
Goger et al.

(10) Patent No.: US 7,950,010 B2
(45) Date of Patent: May 24, 2011

(54) SOFTWARE DEPLOYMENT SYSTEM

(75) Inventors: Karl Goger, Fussgönheim (DE); Ankur Bhatt, Bangalore (IN); Raghunandan S, Bangalore (IN); Rajeev Ranjan, Bangalore (IN); Ajay Kumar, Bangalore (IN)

(73) Assignee: SAP AG, Walldorf (DE)

( * ) Notice: Subject to any disclaimer, the term of this patent is extended or adjusted under 35 U.S.C. 154(b) by 1125 days.

(21) Appl. No.: 11/040,311

(22) Filed: Jan. 21, 2005

(65) Prior Publication Data

US 2006/0168581 A1 Jul. 27, 2006

(51) Int. Cl.
*G06F 9/445* (2006.01)
*G06F 15/177* (2006.01)

(52) U.S. Cl. .................. 717/178; 717/173; 709/220

(58) Field of Classification Search .............. 717/103, 717/121, 168–178; 709/220–222; 713/1–2
See application file for complete search history.

(56) References Cited

U.S. PATENT DOCUMENTS

| | | | |
|---|---|---|---|
| 4,823,304 A * | 4/1989 | Frantz et al. | 709/232 |
| 5,586,323 A * | 12/1996 | Koizumi et al. | 717/174 |
| 5,805,897 A * | 9/1998 | Glowny | 717/178 |
| 6,035,423 A * | 3/2000 | Hodges et al. | 714/38 |
| 6,205,579 B1 * | 3/2001 | Southgate | 717/173 |
| 6,336,185 B1 * | 1/2002 | Sargenti et al. | 713/2 |
| 6,901,580 B2 * | 5/2005 | Iwanojko et al. | 717/121 |
| 7,051,316 B2 * | 5/2006 | Charisius et al. | 717/103 |
| 7,131,124 B2 * | 10/2006 | Hanyu | 717/178 |
| 7,240,336 B1 * | 7/2007 | Baker | 717/135 |
| 7,372,592 B2 * | 5/2008 | Murakata | 717/173 |
| 7,424,719 B2 * | 9/2008 | Duplichan | 717/168 |
| 7,552,432 B2 * | 6/2009 | Aiba | 717/177 |
| 2002/0156877 A1 * | 10/2002 | Lu et al. | 717/178 |
| 2003/0037327 A1 * | 2/2003 | Cicciarelli et al. | 717/178 |
| 2003/0212990 A1 * | 11/2003 | Brodkorb et al. | 717/174 |
| 2004/0143830 A1 * | 7/2004 | Gupton et al. | 717/174 |
| 2004/0199897 A1 * | 10/2004 | Ghercioiu et al. | 717/101 |
| 2004/0226008 A1 * | 11/2004 | Jacobi et al. | 717/168 |
| 2005/0102665 A1 * | 5/2005 | Barta et al. | 717/174 |
| 2005/0262503 A1 * | 11/2005 | Kane | 717/176 |
| 2006/0080656 A1 * | 4/2006 | Cain et al. | 717/174 |

OTHER PUBLICATIONS

Mikic-Rakic et al., Architecture-Level Support for Software Component Deployment in Resource Constrained Environments; SpringerLink, 2002, 20pg.* Sudman et al., "Software Deployment Using Mobile Agents"; SpringerLink, 2002, 11pg.*
Tarkoma et al., "Supporting Software Agents on Small Devices"; ACM, 2002, 2pg.*

* cited by examiner

*Primary Examiner* — Wei Y Zhen
*Assistant Examiner* — Ryan D Coyer
(74) *Attorney, Agent, or Firm* — Kenyon & Kenyon LLP

(57) ABSTRACT

The present invention provides a system and method for deploying software onto multiple heterogeneous systems at the same time. A generic software deployment manager may deploy software by communicating with client software deployment services residing on the systems that are receiving the software deployment. The software deployment manager can operate independent of the software and the operating system on which software is being deployed by communicating with the client software deployment service. To execute a software deployment, the software deployment manager may send software deployment messages containing generic commands that signify operations to be performed to deploy software. The client software deployment service provides an interface between the software deployment manager and the recipient system by translating these generic commands to commands that are compatible with the local operating system. The software deployment manager may transmit software deployment messages simultaneously to each of the systems within a system group or an environment so that software can be efficiently deployed without incompatibilities in the network. The software deployment manager may deploy software in Linux, Windows, Unix, Macatosh, Java, or any other operating system and may deploy any software.

35 Claims, 7 Drawing Sheets

SOFTWARE DEPLOYMENT SYSTEM

BACKGROUND

Information and computer technology comprises an essential component for modern business operations. Computer technology is constantly evolving providing customers with new services and improving existing services. Businesses enhance their existing computer software to provide improvements to end customers. This requires that new software be installed or that existing software be modified or upgraded to include the new enhancements.

Businesses may have many computers that operate together to provide customers with services. When a service is added or enhanced, these computers may require a new software installation or an upgrade of existing software. This may require installing new software or upgrading existing software on each computer used to provide the service. To install or upgrade software, an administrator may perform a local installation or upgrade on the actual device to download a software installation package on the device. An administrator may manually download a software installation package to provide new or enhanced functionality. Performing the new installation or upgrade locally may require overhead and may be a time consuming process. Additionally, incompatibilities may arise because the installation or upgrade was performed on some computers, but not others. This is cumbersome especially for businesses that frequently install or enhance software on systems that operate using different operating systems.

DETAILED DESCRIPTION

The present invention provides a system and method for deploying software onto multiple heterogeneous systems at the same time. A generic software deployment manager may deploy software by communicating with client software deployment services residing on the systems that are receiving the software deployment. The software deployment manager can operate independent of the software and the operating system on which software is being deployed by communicating with the client software deployment service. To execute a software deployment, the software deployment manager may send software deployment messages containing generic commands that signify operations to be performed to deploy software. The client software deployment service provides an interface between the software deployment manager and the recipient system by translating these generic commands to commands that are compatible with the local operating system. The software deployment manager may transmit software deployment messages simultaneously to each of the systems within a system group or an environment so that software can be efficiently deployed without incompatibilities in the network. The software deployment manager may deploy software in Linux, Windows, Unix, Macatosh, lava, or any other operating system and may deploy any software.

Figure 1:
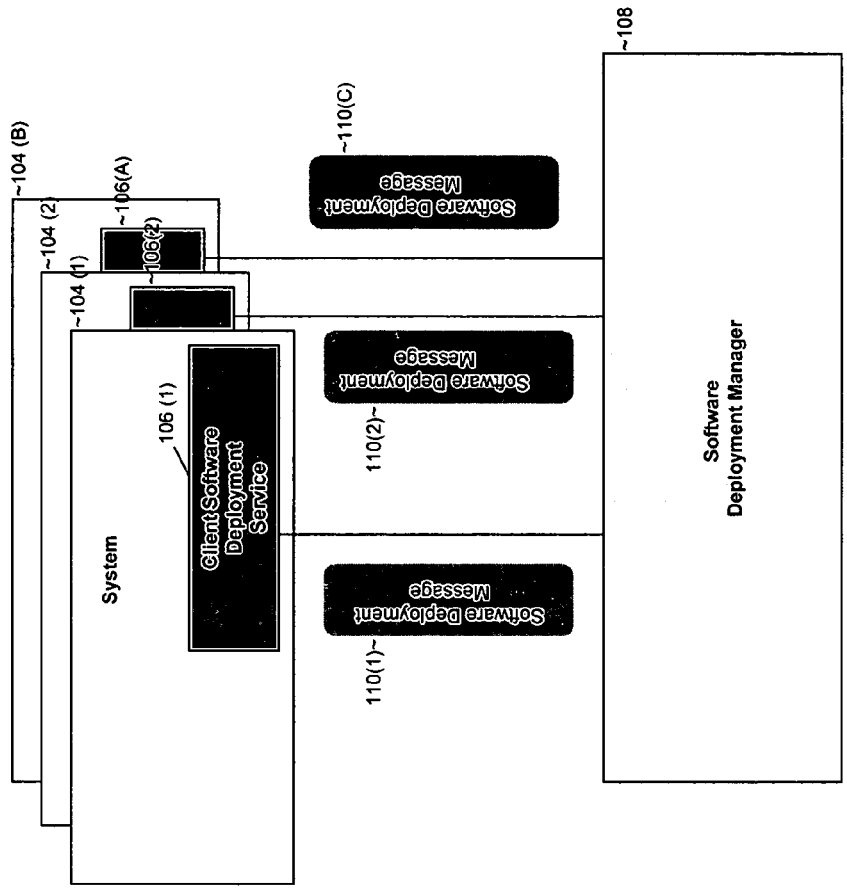
FIG. 1 shows a generic software deployment network according to one embodiment of the invention.

FIG. 1 shows a generic software deployment network 102 according to one embodiment of the invention. Generic software deployment network 102 may deploy software on any of systems 104 (1)-104(B), regardless of the operating system or software used by these systems. Generic software deployment network 102 comprises client software deployment services 106(1)-106(A) residing on systems 104(1)-104(B) and software deployment manager 108. Software is deployed on generic software deployment network 108 by transmitting software deployment messages 110(1)-110(C).

Software deployment manager 108 may deploy software on many systems because software deployment manager 108 remains independent of system 104, on which software will be deployed. Software deployment manager 108 remains independent of system 104 because client software deployment service 106 provides an interface to system 104 for the purpose of deploying software. Software deployment manager 108 may communicate with client software deployment services 106(1)-106(A) by transmitting software deployment messages 110(1)-110(C). Software deployment messages may comprise generic process steps or process configurations that point to locations of software installation packages. Each software deployment message 110 may also include system information, such as an address of a system on a network. Client software deployment service 106 translates software deployment message 110 and executes the software deployment. The software deployment may be executed by running the software installation package from the location where it is stored. The software installation may be stored in a directory on system 104 that typically stores software installations or may be stored at a location that is specified at run-time by a user.

System 104 may be any combination of one or more programmable processors and machine-readable medium that stores data. Machine-readable medium of system 104 may store computer code that will be modified in accordance with the deployment instructions provided by software deployment manager 108. After the software deployment is complete, the new or modified computer code will reside on system 104. Computer code may be implemented in any combination of any high-level procedural, object-oriented and/or assembly machine language.

Client software deployment services 106(1)-106(A) may be any computer code that communicates with software deployment manager 108 and translates commands received from software deployment manager 108 to execute a software deployment. In one embodiment of the invention, client software deployment service 106 is client software that resides on system 104. However, client software deployment services 106(1)-106(A) may reside in any machine-readable medium and may be processed by any programmable processor.

Figure 2:
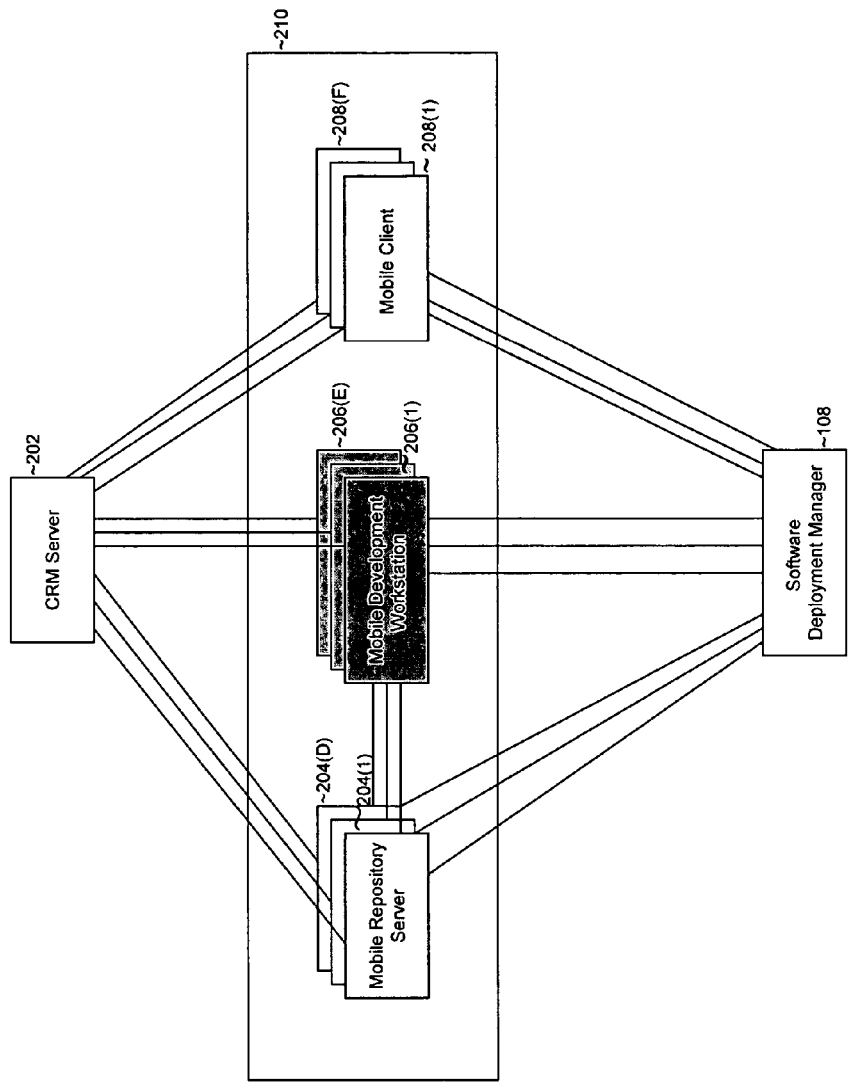
FIG. 2 shows a mobile software deployment network according to one embodiment of the invention.

FIG. 2 shows an architecture for a mobile software deployment network 200 according to one embodiment of the invention. A mobile network may comprise many mobile clients 208(1)-208(F) that are operated in the field such as cellular telephones, personal data assistants, and laptop computers or any other device that provide customers with access data.

Deploying software on mobile clients 208(1)-208(F) may be difficult since users may not want to bring mobile client 208 to an administrator to have software deployed thereby giving up benefits, such as the ability to travel and make contact from remote locations. Users may also not want to perform the software deployment themselves. Software deployment manager 108 may simultaneously deploy software on each of the devices of mobile software deployment network 200, including mobile clients 208(1)-208(F) that are remotely located. Users may avoid performing steps to deploy software, may be able to use their device in the field while the deployment is being run and may avoid incompatibility issues with upgraded systems that are not located in the field.

Mobile software deployment network 200 may comprise a customer relationship management (CRM) server 202, mobile environment 210, and software deployment manager 108. Mobile environment 210 may provide users of mobile clients 208(1)-208(F) access to services provided by CRM server 202. In one embodiment of the invention, CRM server 202 provides customer relationship management functions including marketing planning, campaign management, customer segmentation, other marketing analysis, sales planning and forecasting, sales organizational and territory management, account and contact management or other sales support or analysis.

Mobile environment 210 may comprise mobile repository servers 204(1)-204(D), mobile development workstations (MDWs) 206(1)-206(E), and the mobile clients 208(1)-208(F), which will receive a software deployment. Mobile repository servers 204(1)-204(D) may be connected to CRM server 202 to provide access to a mobile application repository (not shown), which comprises databases that store mobile user access data and also provides access to repository tools and services. Mobile development workstation 206 may be connected to mobile repository server 204 to provide development and administrative maintenance tools as well as access to a database of users. In one embodiment of the invention mobile repository server 204, mobile development workstation 206 and mobile client 208 operate using the Windows operating system. However, these devices may have an operating system and these devices need not have the same operating system.

Software deployment manager 108 may be connected to mobile repository servers 204(1)-204(D), mobile development workstations 206(1)-206(E) and mobile clients 208(1)-208(F) to control the deployment of software on these devices by transmitting software deployment messages 110(1)-110(C). These connections may be wired or wireless, depending on the device, allowing, for example, mobile clients 208(1)-208(F) to be operated by users in the field while receiving a software deployment. Software deployment manager may but need not be co-located with any of mobile repository servers 204(1)-204(D), mobile development workstations 206(1)-206(E) or mobile clients 208(1)-208(F) to deploy software on these systems. Upon receipt of a software deployment message 110, each client software deployment service 106 residing on mobile repository servers 204(1)-204(D), mobile development workstations 206(1)-206(E) and mobile clients 208(1)-208(F) may translate the message to deploy software. Client software deployment services 106(1)-106(A) may run in the background without user intervention but keep a user informed during processing.

Software deployment manager 108 recognizes hierarchies of systems that can receive deployed software. A "landscape" may be the highest entity within this hierarchy, which may represent an entire customer network with a set of environments within it. "Environments" may each be a logical set of system groups that are defined as a set to to ease management of software deployments by allowing a user to execute a software deployment to any of systems 104(1)-104(B) within the selected environment. For example, a user may select mobile environment 210 and execute a software deployment on mobile repository servers 204(1)-204(D), mobile development workstation 206(1)-206(E) and mobile clients 208(1)-208(F) simultaneously. Mobile environment 210 may be within a mobile landscape that also includes, for example, a mobile development environment and a mobile test environment. "System groups" may be sets of systems chosen from systems 104(1)-104(B). Exemplary system groups are the group of mobile repository servers 204(1)-204(D), the group of mobile development workstations 206(1)-206(E), and the group of mobile clients 208(1)-208(F). Grouping systems in this manner allows software deployment on grouped systems to be handled in an efficient manner without significant user intervention.

Mobile software deployment network 200 can be implemented in a computing system that includes any combination of one or more back-end components (e.g., as data servers), middleware components (e.g., application servers), or front-end components (user interfaces). Connections in mobile software deployment network 200 can be realized in any form of circuitry and/or medium, including any wireless technology that allows transmission of digital data.

Figure 3:
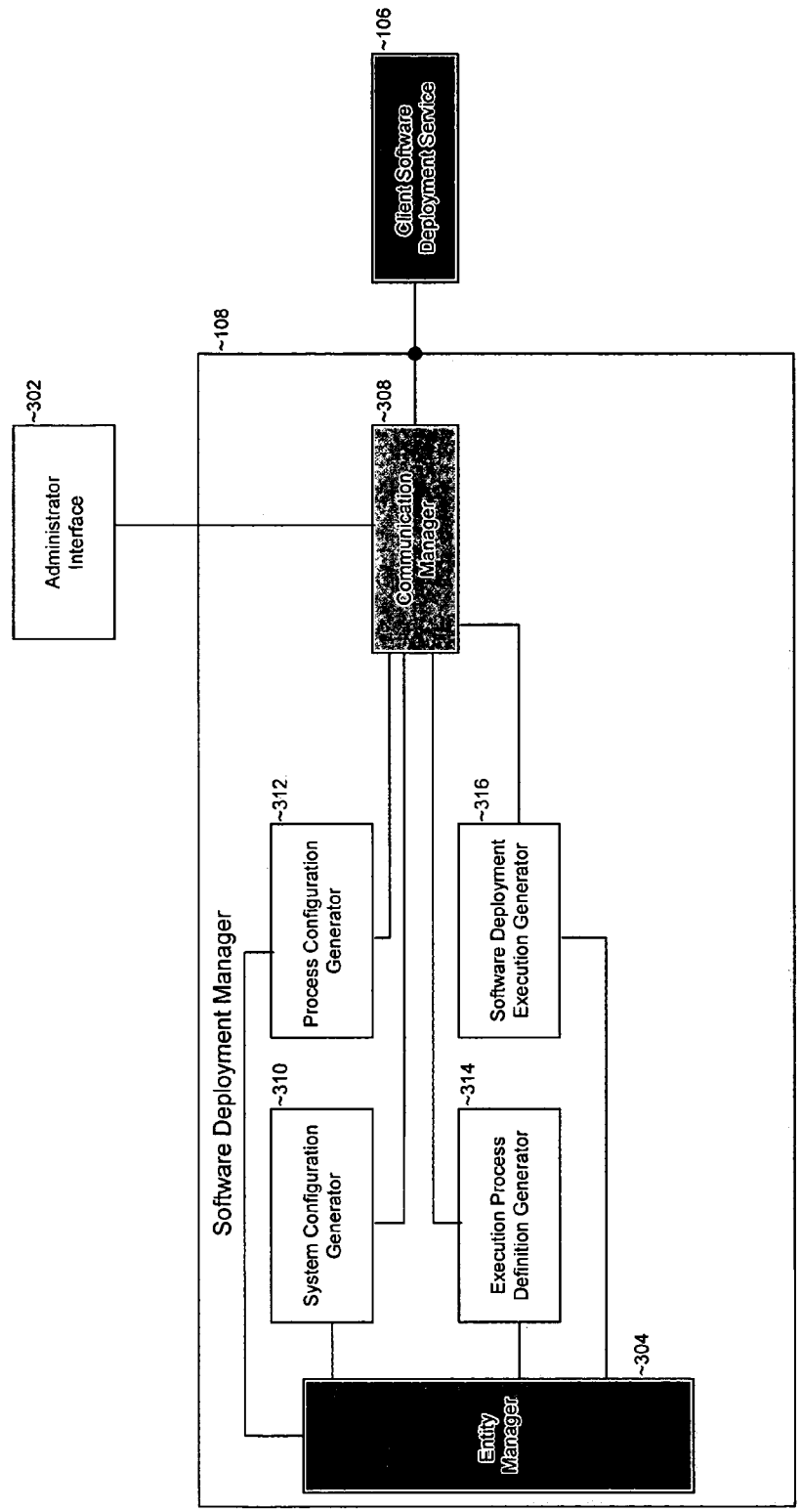
FIG. 3 shows a software deployment manager interface architecture according to one embodiment of the invention.

FIG. 3 shows a software deployment manager interface architecture 300 according to one embodiment of the invention. The software deployment manager interface architecture 300 comprises a software deployment manager 108 and entities that are connected to software deployment manager 108. In one embodiment of the invention, software deployment manager interface architecture 300 comprises administrator interface 302, software deployment manager 108, and client software deployment service 106.

Software deployment manager 108 may transmit software deployment messages 110(1)-110(C) to provide generic instructions to client software deployment service 106 to execute a software deployment. These generic instructions may include one or more executable units such as process groups, processes, actions and tasks. A "process group" may be a logical set of sequential processes that are performed on a type of system. A process group may represent a complete set of executable units to upgrade system 104. "Processes" may be executable units that perform a set of operations that leave a system 104 in stable condition after execution. A process group may include multiple processes some of which depend on other processes to execute a software deployment. A user may group processes so that if one of the processes fails, subsequent processes included in the process group are not performed.

A process may be a logical group of actions or tasks that may be performed in a sequence to define the upgrade process. "Actions" may be logical groups of tasks that may be performed in a particular sequence. "Tasks" may be the most basic entity of the process hierarchy. A task is the basic unit of execution that can be defined using software deployment manager 108 and will be performed on a client software deployment service 106. A task is created from a command and can take a structure such as <TASK>-<COMMAND><PARAMETERS>. A command is the atomic operation of the definition of an operation. It signifies the operation that is performed at the time of execution. It may not contain information about the actual execution. Commands may be generic so that they may operate with different types of systems. In one embodiment of the invention, there is a fixed set of commands supported by an application. Each command is based on the operation it will perform. Below is a table listing some examples of commands and associated parameters:

| Command | Parameter | Description |
|---|---|---|
| Copy | File | Copies a file. |
| Delete | File | Deletes a file (only on the target). |
| Run | File | Runs a file as a new process. |
| Wait | | Waits for all processes to terminate. |
| Get | File | Copies a file to the SDM system (e.g. because this file must be sent to a different system). |
| Check | File, Error-String | Checks if Error-String exists in the file file. Used together with Stop/Loop on result. |
| Stop on result | Output Text | If the process has terminated not with zero, the processing stops and the outputText is displayed until the user continues the process in the management tool manually. |
| Loop on result | | If the process has terminated not with zero, the processing continues at the top of the task definition. |
| End | | Stops the task processing. |

A parameter for a command may be the path to an installation, which may be specified as a pre-defined location where files will be installed or executed from or a tag that allows a user to supply the proper filename(s) when the software deployment is executed.

Software deployment execution generator 316 may start execution of an upgrade. According to one embodiment of the invention, to start the execution, the user specifies a path where an installation is present and chooses the execution steps to be performed. An installation is a software package that is typically provided by the software and/or system manufacturer for installing the software onto a computer. The installation can be stored on a system that is receiving the deployment or on a remote system.

Software deployment message 110 may be generated to communicate information from the software deployment manager 108 to the client software deployment service 106. A software deployment message 110 identifies a system, for example by providing an IP address, and also provides the executable units that will be processed to deploy software and parameters of these executable units, such as a filename of an installation package. A software deployment message 110 may be sent to perform a particular execution step, comprising one or more interrelated executable steps. If an executable unit sent in a software deployment message 110 fails, subsequent steps transmitted in the software deployment message 110 may not be performed to avoid execution of steps that are dependent on the failed step. An administrator may design a software deployment to so that each software deployment message comprises a set of interrelated tasks to protect against continued deployment in the event of failure of a necessary step. According to one embodiment of the invention, software deployment message 110 has a header and a detail part. The header contains information about the message. The detail part will contain actual instructions that when processed will execute the installation or upgrade. The header may hold information about the client system like the system address, name, current date and time, security related information. The detail part may hold information about the tasks to be performed on system 104 to execute the software deployment. An exemplary software deployment message 110 is below:

```
<Header Name="INLD50022871" IPAddress= "10.49.122.43"
Date = "11/01/2003"
Time ="00:12:12" EncryptionKey= "">
</Header>
<ExecSteps Name="">
<Process Name="">
    <Task11 Name="Copy" Optional Param1="" Optional Param2="">
    <Task12 Name="Run" Optional Param1="" Optional Param2="">
    <Task13 Name="Delete" Optional Param1="" Optional Param2="">
</Process>
<Process Name="">
    <Task11 Name="Copy" Optional Param1="" Optional Param2="">
    <Task12 Name="Run" Optional Param1="" Optional Param2="">
    <Task13 Name="Delete" Optional Param1="" Optional Param2="">
</Process>
</ExecSteps>
```

Administrator interface 302 may be connected to software deployment manager 108 via communication manager 308 to allow an administrator to set-up a software deployment using software deployment manager 108. Administrator interface 302 may provide a user interface to allow a user to setup the software deployment configurations and initiate execution. Administrator interface 302 may be any device that allows an administrator to provide input to software deployment manager 108 and receive information from software deployment manager 108. Administrator 302 may be a client computer having a graphical user interface (GUI), a Web browser, a phone, or a personal data assistant) or any other device having an output device (e.g., liquid crystal display (LCD), cathode ray tube (CRT), or ear-piece) for displaying information to a user and/or an input device (e.g., keyboard, mouse, trackball, keypad) by which the user can provide input to the computer. Other types of administrator interfaces 302 may provide to the user any form of sensory feedback (e.g., visual feedback, auditory feedback, or tactile feedback) and receive from the user input in any form including acoustic, speech, or tactile input.

System configuration generator 310, process configuration generator 312, and execution process definition generator 314 may configure and define the software deployment. System configuration generator 310, process configuration generator 312 and execution process definition generator 314 may be connected to entity manager 304 to store configurations that are generated and may also be connected to communications manager 308 so that an administrator can provide input to the configuration using administrator interface 302.

System configuration generator 310 may query a user for information about an entity, such as the system 104 and store that information. Process configuration generator 312 may query a user to define the executable units, such as tasks, activities, processes or process groups. Once the processes and the system are defined, the user may define the actual steps to be performed during the deployment by linking a process or process group to a configuration of the entity to be upgraded using the execution process definition generator 314. After the execution process has been defined, the user may initiate execution of the software deployment by, for example, responding to a query from the software deployment execution generator 316.

System configuration generator 310 provides a tool for defining system 104, as well as other groups with a hierarchy, such as system groups, environments, and landscapes. System configurations may comprise a system identifier, a system name, and an address on the network, such as an Internet Protocol address. Objects may be stored for each entity, e.g., system, system group, environment or landscape that is defined. Entity manager 304 may manage these objects.

Process configuration generator 312 may query a user to characterize commands and processes into different groups that will be executable units performed during run-time. Process configuration generator 312 may query a user to define the tasks that will be performed as well as querying a user to define other executable units, e.g., actions, processes and process groups. Objects may be stored for each executable unit, e.g., task, action, process or process group that is defined. Entity manager 304 may manage these objects.

The execution process definition generator 314 may query a user to specify which of processes should run on which systems 104(1)-104(B) and link the appropriate process and system configurations. According to one embodiment of the invention, once users specify this link, the information is maintained so that users do not have to specify the link again. In one embodiment of the invention, a system administrator specifies a link using a user interface that allows selection of some of systems 104(1)-104(B) to be linked to a process or process group or selection of system groups to be linked to a process or process group. These links may be stored in the system using parent-child relationships between objects representing the linked entities. Since systems 104(1)-104 (B) can be grouped into system groups, a single execution process definition can deploy new software or upgrade existing software on multiple systems within the system group. This significantly reduces the burden of performing software deployment on systems that will process the deployment in the same manner.

Entity manager 304 may store system configurations, process configurations, and execution process definitions. Entity manager 304 may also retrieve data to provide user interfaces and to store data as a result of commands supplied by the user. Entity manager 304 may be connected to system configuration generator 310, process configuration generator 312 and execution process definition generator 314 to display user interfaces and perform processing as directed by an administrator.

The data associated with these entities is stored in storage 306. This data may be stored in one or more files such Extensible Markup Language (XML) files in the form of entity objects. According to one embodiment of the invention, data is stored in an as Software Deployment Manager (SDM) metadata XML file. This SDM metadata XML file may store the name of each object and its attributes. SDM metadata XML file may also depict the relationships between various configurable objects. Entity objects that might store this data are described in the table below.

| Structure of Configurable Objects | | |
|---|---|---|
| Configurable Object | Attributes | Relationships |
| Landscape | Landscape name, Id, Parentid, Loaded. | Environments (Child) |
| Environment | Environment name, ID, Parentid, Loaded. | System groups (Child), Landscape (Parent) |
| System Groups | System group name, Id, Parentid, Loaded | Systems (Child), Execution Step (Child), Environment (Parent) |
| Systems | Id, System name, System IP Address, InNetwork, Parentid, Loaded | System Groups (Parent), Execution Step (Child) |
| Command | Id, Parentid, Loaded, Command name | Parameters (Child) |
| Task | Task name, Id, Command name, Parentid, Loaded | Process (Parent), Action (Parent), Parameters (child) |
| Parameters | Id, Parameter Name, Parameter Value, Parameter placeholder value, Parent id, Loaded | Tasks (Parent) |
| Action | Action name, Id, Parentid, Loaded. | Process (Parent), Tasks (Child) |
| Process | Process name, Id, Parentid, Loaded | Process group (Parent), Tasks (Child), Actions (Child) |
| Process Groups | Process group name, Id, Parentid, Loaded | Processes (Child) |
| Execution Step | Id, Parentid, Loaded | Processes (Child), Process groups (Child), System group (Parent), System (Parent) |

Software deployment manager 108 may receive these selections and use object-oriented programming techniques, including parent-child relationships to represent the link. For example, a user may select from systems 104(1)-104(B) and indicate that these selections should be linked to a process group. Software deployment manager 108 may have these selections stored as system objects and a process group object. To identify which of systems 104(1)-104(B) are linked to a process group, software deployment manager 108 may establish an execution step object having a corresponding process object and/or process group object as a child. System objects representing systems that will receive the software deployment may be children of the execution step object.

Software deployment manager 108 also comprises communication manager 308. Communication manager 308 may facilitate communication between software deployment manager 108 and external devices. For example, communication manager 308 may perform handshaking to facilitate sending and receiving data to and from the external device. According to one embodiment of the invention, communication manager 308 is connected to the administrator interface 302 to receive commands from an administrator and to provide information to the administrator. Communication manager 308 may also be connected to entity manger 304 to provide information received from the administrator to the other elements of software deployment manager 108. Additionally, communication manager 308 may be connected to client software deployment service 106 to send messages to execute a software deployment and to receive messages providing status of a software deployment. Communication manager 308 may construct a software deployment message 110 to provide information to client deployment service 106.

Communication manager 308 may also provide security for the transmission of a software deployment message 110 as well as handling a transmission protocol e.g., Transmission Control Protocol/Internet Protocol (TCP/IP), which is a communications protocol developed to internetwork dissimilar systems. TCP provides transport functions, which ensures that the total amount of bytes sent is received correctly at the other end. The IP part of TCP/IP provides routing capability.

Figure 4:
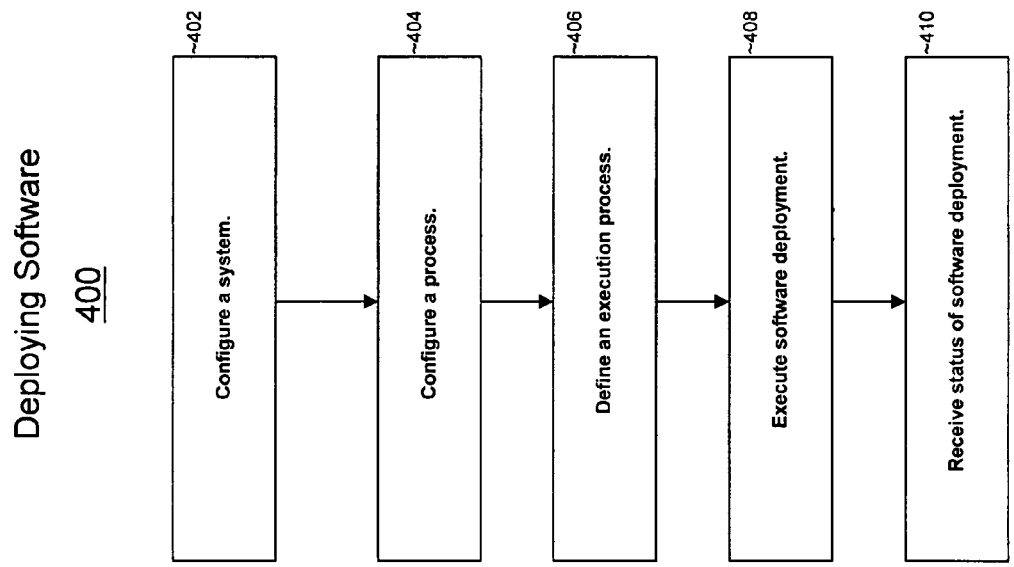
FIG. 4 shows an operation performed by a software deployment manager for deploying software according to one embodiment of the present invention.

FIG. 4 shows the operation of a software deployment manager 400 according to one embodiment of the invention. In step 402, a user sets up a system configuration. Software deployment manager 108 accepts input from a user and stores a system configuration. Software deployment manager 108 may configure a system 104, system group, environment or landscape or any combination of these entities and may store these configurations as objects. For example, a user may provide a system name and system IP address for system 104. The relationship among the configurations can be established using parent-child relationships.

In step 404 a process is configured by software deployment manager 108. Software deployment manager 108 may configure a task, action, process, process group or any combination of these entities and store these configurations as objects. The relationship among the configurations can be established using parent-child relationships. Since the process configuration is independent of the system configuration, step 404 may be performed prior to step 402.

Software deployment manager 108 may receive a definition of a task in the form of <TASK>-<COMMAND><PARAMETERS>. This executable unit may run a file that executes a software installation package. For example, a user may configure a task to have the command "Run," which includes as a parameter a file that contains the software installation package. A user may configure the file to be a pre-defined location such as a Windows Temporary Folder, a Mobile Client Installation Path, or a system drive. A user may store the installation package and/or any other files that when processed install or upgrade software. The package that is stored at the specified location will be run when the software deployment is executed. Alternatively, a user may insert a tag during configuration of the commands so that the proper filename(s) may be supplied when the software deployment is executed. These files may include installation software that installs or upgrades software on one or more systems that are receiving the software deployment.

A software deployment manager 108 may configure a process as comprising one or more interrelated tasks or actions. A process may be a set of computer instructions that when processed execute a software deployment. In an alternate embodiment of the invention, the software deployment manager 108 may configure a process group that comprises multiple interrelated processes, which when processed together execute a software deployment.

In step 406, an execution process is defined. Software deployment manager 108 may define an execution process by accepting user input specifying a link of a system definition or system group to a process group or a process. This link may be defined using an execution step object. The execution step object may include processes and process groups that are defined as children and system and system groups that are defined as parents. System configurations, process configurations and execution step definitions may each be stored indefinitely. In an alternate embodiment of the invention, a system configuration and/or a process configuration may be received by another processing system and downloaded to software deployment manager 108.

In step 408, a software deployment is executed. Software deployment manager 108 may execute a software deployment by receiving input from a user requesting execution and issuing a software deployment message 110 to client software deployment service 106. The software deployment message 110 may comprise information received during configuration. Communication from software deployment manager 108 to client software deployment service 106 (or any other entity that assists in execution) may be in any form that is understood by both devices and is not limited to a software deployment message 110. Step 408 need not be performed within any specified period of time after steps 402 through 406.

To execute a software deployment, software deployment manager 108 may transmit software deployment messages 110(1)-110(C) to each system within the entity e.g., environment, system group or system that was selected by a user. Execution of a software deployment to many systems within a large entity may be efficient and may reduce incompatibilities among network components that interact with each other. Since software deployment manager 108 may be connected to components via a network, software deployment messages 110(1)-110(C) may be transmitted via the network to systems at remote locations. In one embodiment of the invention, software deployment manager 108 may search a database that maintains availability information to determine if a system is available, e.g., logged onto the network prior to transmitting a software deployment message 110 to that system. If a system is not available, software deployment manager 108 may hold the software deployment message 110 and then search the database again according to a preset interval. When the system becomes available, the software deployment manager 108 may then transmit the message.

In step 410, status is provided of the software deployment, for example, via a software deployment log message. A user may choose to receive a task level software deployment log message or a process level software deployment log message. This allows the user to decide the level of detail of the status that will be provided. If the user wants to see the status for each task that is executed, the user may select to see a detailed task level status. If the user wants to see a higher level status, the user may select a process level status instead. In other embodiments of the invention, other levels of status may be provided. In one embodiment of the invention, client software deployment service 106 provides the user with the status. In an alternate embodiment of the invention, software deployment manager 108 provides the user with a status. Alternate embodiments of the invention are possible in which no status is provided to a user or both client software deployment service 106 and software deployment manager 108 provide users with statuses.

Figure 5:
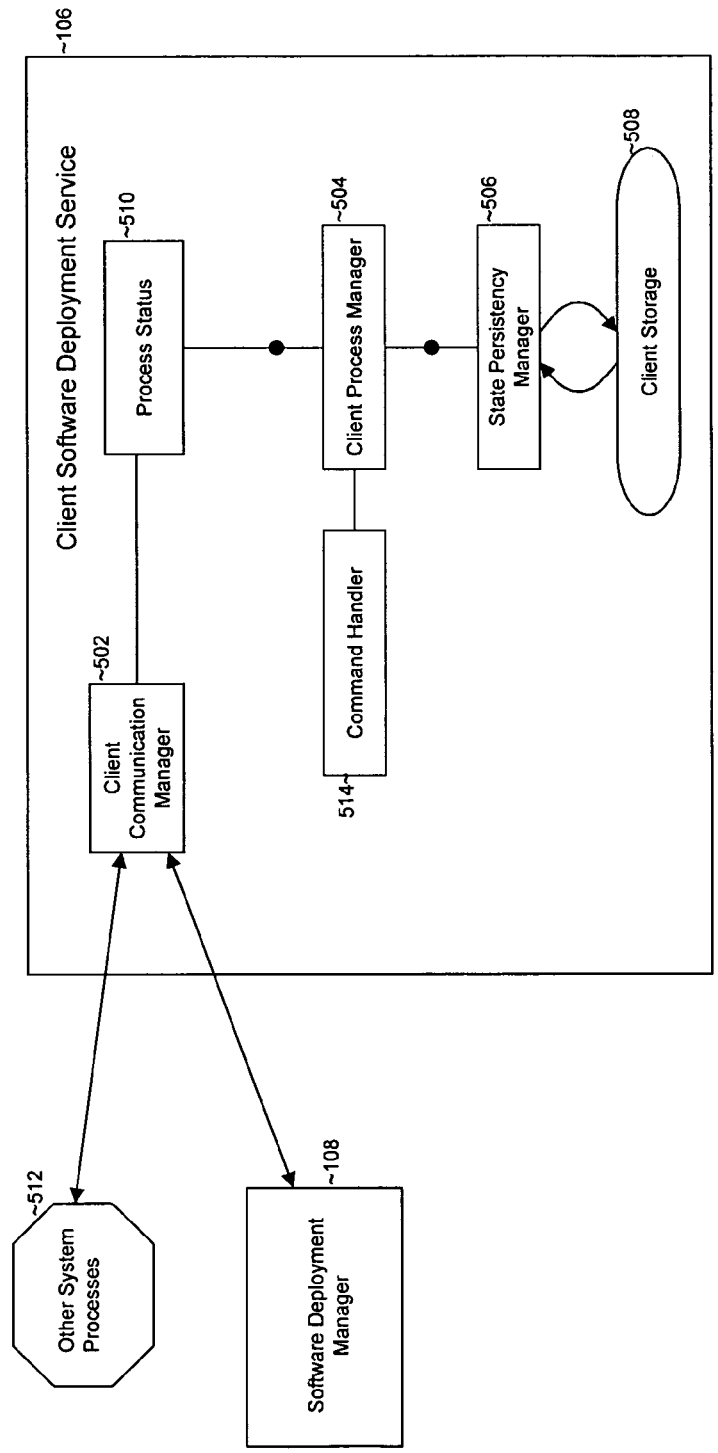
FIG. 5 depicts client software deployment service interface architecture according to one embodiment of the present invention.

FIG. 5 depicts client software deployment service interface architecture 500 according to one embodiment of the present invention. Client software deployment service interface architecture 500 includes client software deployment service 106, software deployment manager 108 and other system processes 512. Client software deployment service 106 comprises client communication manager 502, process status 510, client process manager 504, command handler 514, state persistency manager 506 and client storage 508. Client communication manager 502 is connected to process status 510 to facilitate communications between the client software deployment service 106 and external systems. Process status 510 is connected to client process manager 504 to obtain information about the progress of the software deployment from the client process manager 504 and provide status to the user and/or to the software deployment manager 108. Client process manager 504 controls the software deployment and is connected to command handler 514 to receive translated messages and to state persistency manager 506 to send information regarding the current state of the software deployment so that it can be persisted. The state persistency manager 506 is connected to client storage 508 to store a persisted state.

Client communication manager 502 is connected to other system processes 512 of system 104 to deploy software on system 104. In an alternate embodiment of the invention, client communication manager 502 is connected to an external system 104 via, for example, a communication link or a network. Client communication manager 502 handles communications for client software deployment service 106. Client communication manager 502 is also connected to software deployment manager 108 to facilitate communications between software deployment manager 108 and client software deployment service 106. For example, client communication manager 502 may provide handshaking to indicate that client software deployment service 106 is ready to receive software deployment message 110.

Client software deployment service 106 performs upgrades by executing steps in software deployment message 110 sent to initiate the new installation or upgrade. Client software deployment service 106 also may provide the user with a status via a Tool Bar Icon and/or a dialog box. Process status 510 within client software deployment service 106 provides the user with a status of the upgrade. Process status 510 may act as a bridge between client communication manager 502 and client process manager 504 by receiving and sending information and collecting status information that will be included in a software development log message and/or providing an icon or dialog box with a status to a user. In one embodiment of the invention, the user is not given the option to stop the upgrade once the upgrade process has started.

Client process manager 504 is responsible for interpreting the software deployment message 110 and executing tasks one by one. It interacts with client communication manager 502 to receive messages from software deployment manager 108. Client process manager 504 calls command handler 514 to execute the message. Command handler 504 provides an interface between the software deployment manager 108 and the system 104. Command handler 504 can accept commands sent by software deployment manager 108 and, if needed, translate them to commands understood by system 104 so that they can be executed. Command handler 504 may perform this translation by using a look-up table residing in machine-readable medium on system 104. Command handler may search this look-up table for the generic command retrieved from software deployment message 110 and retrieve a corresponding system compatible command from the look-up table. An exemplary look-up table is below.

| Generic Command | System Compatible Command | Description |
| --- | --- | --- |
| Copy | Retrieve Copy | Copies a file. |
| Delete | Purge | Deletes a file (only on the target). |
| Run | Start | Runs a file as a new process. |
| Wait | Hold | Waits for all processes to terminate. |
| Check | Search | Checks if Error-String exists in the file file. Used together with Stop/Loop on result. |
| Stop on result | Halt Processing | If the process has terminated not with zero, the processing stops and the outputText is displayed until the user continues the process in the management tool manually. |
| Loop on result | Continue Processing | If the process has terminated not with zero, the processing continues at the top of the task definition. |
| End | Terminate Processing | Stops the task processing. |

For example, if software deployment manager 108 sends a software deployment message 110 with a command "Run" and an associated parameter, command handler 514 can interpret "Run" using operating system commands of system 104.

If, for example, the command corresponding to "Run" on system 104 is "Start," command handler 514 executes a start using the associated parameter transmitted in the software deployment message 110.

In an alternate embodiment of the invention, the look-up table may reside in machine-readable medium on another programmable device that may be accessed by system 104. The look-up may be performed by first translating the system IP address to determine the type of system that is requesting translation and then searching for a look-up table that corresponds to the type of system that requests translation. Alternatively, when client software deployment service 106 requests translation, it may include the type of system requesting translation in its request.

During and after processing a software deployment message 110, client process manager 504 may provide a status to software deployment manager 108. During and after processing a software deployment message 110, client process manager 504 may provide a status to software deployment manager 108. Exemplary statuses are provided below.

| Status | Description |
| --- | --- |
| Running | The task is being executed. |
| Waiting | The task is in waiting while the system processes another task. |
| Success | The task was successfully executed. |
| Failure | Execution of the task failed. |
| Stop | A system administrator chose to stop execution. |

Client process manager 504 interfaces with state persistency manager 506 to persist its state. State persistency manager 506 preserves the state of the client software deployment service 106 so that status of the installation or upgrade can be provided. The state of client software deployment service 106 may be persisted because client software deployment service 106 may be prone to exceptions due to its execution of different processes. Persisting the state of client software deployment service 106 allows client software deployment service 106 to communicate its state to software deployment manager 108 even if a process that is being executed fails.

According to one embodiment of the invention, process status 510 may create a software deployment log message to provide the status to software deployment manager 108. The software deployment log message may provide the status of the tasks, which are performed on the client, including the success/failure of each task, and inform the software deployment manager 108 whether the software deployment was successful or not.

The software deployment log message may comprise a header that holds information such as server name, start date and time, end date and time, and information related to encryption/decryption and a detail part containing information about the success or failure of tasks or processes. According to one embodiment of the invention, two types of software deployment log messages are transmitted. The header may be the same for both of the messages. However, the detail part may be different. The two types of messages are outlined below.

1. Task level message—The task level message is submitted to software deployment manager 108 after completion of every task.
2. Process level message—The process level message is submitted to software deployment manager 108 after completion of each process. The process level message may have task level details.

According to one embodiment of the invention, a user chooses the type of software deployment log message to be transmitted. Below is an exemplary software deployment log message.

```
<Header Name="INLD50022851" IPAddress= "10.49.122.13"
Date = "11/01/2003"
Time ="00:12:12" EncryptionKey= "">
</Header>
<Log>
<Process1="">
    <Task11 Name="Copy" Status="S" StartDateTime = ""
    EndDateTime = ""/>
    <Task12 Name="Run" Status="S" StartDateTime = ""
    EndDateTime =""/>
    <Task13 Name="Delete" Status="F" StartDateTime = ""
    EndDateTime = "" >
<Log>LogFile.zip </Log>
    </Task13>
</Process>
<Process2="">
    <Task21="Copy" Status=""/>
    <Task22="Run" Status=""/>
    <Task23="Delete" Status=""/>
</Process>
</Log>
```

Figure 6:
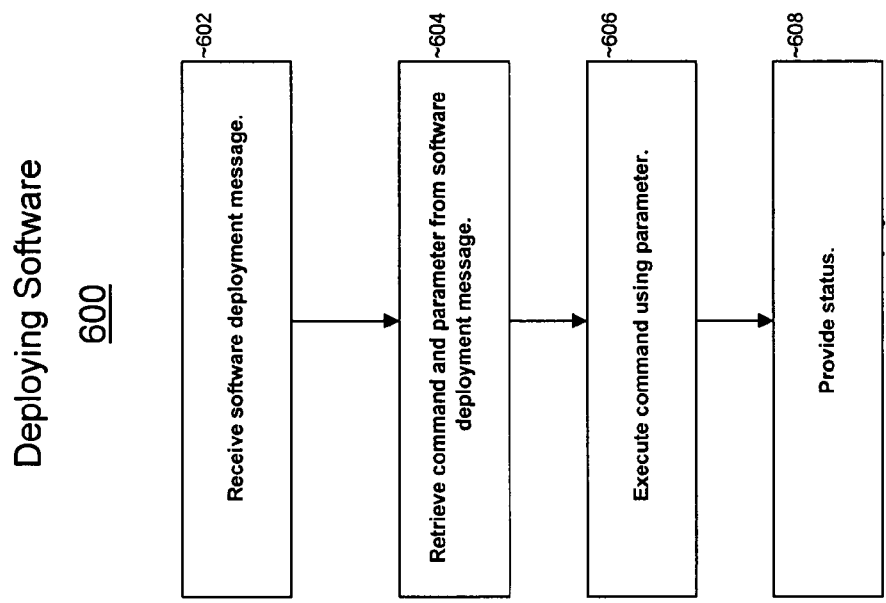
FIG. 6 shows the operation of a client software deployment service according to one embodiment of the invention.

FIG. 6 illustrates the operation of a client software deployment service 106 according to one embodiment of the invention. A client software deployment service 106 may execute software on system 104. Client software deployment service 106 may assist in the execution by providing an interface between software deployment manager 108, which is neutral of the system 104, which is receiving the software deployment.

In step 602, a software deployment message 110 is received by client software deployment service 106. Client communication manager 502 receives the software deployment message 110 and sends it to client process manager 504.

In step 604, client process manager 504 parses the software deployment message 110. Client process manager 504 may perform initial checking to ensure that a valid software deployment message 110 was received and system 104 was the intended destination of the software deployment message 110. Client process manager 504 may send a command and parameter received in the software deployment message 110 to command handler 514.

In step 606, command handler 514 executes the command received in the software deployment message 110. Command handler 514 may translate the command by checking a lookup table that provides operating system commands of system 104 that correspond to commands transmitted by software deployment manager 108. Command handler 514 notifies client process manager 504 of the result of the execution.

In step 608, client software deployment service 106 provides a status of the software deployment. Client process manager may provide a status to process status 510. Process status 510 may provide a status of the software deployment by, for example, providing a short message on a Tool Bar Icon and/or a dialog box. Process status 510 may also create a software deployment log message and transmit this message to software deployment manager 108.

Figure 7:
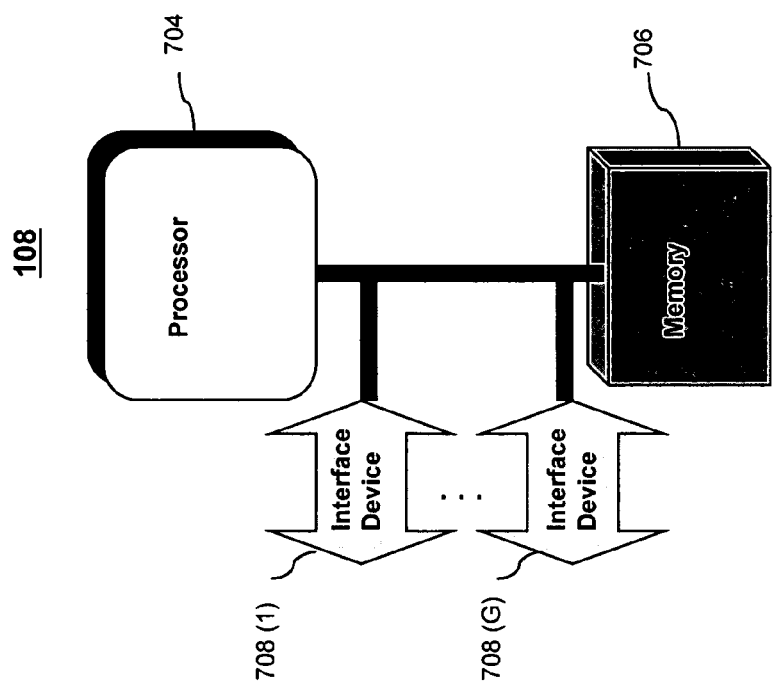
FIG. 7 shows a structure of a software deployment manager according to one embodiment of the invention.

FIG. 7 shows a software deployment manager according to one embodiment of the invention. Software deployment manager 108 includes processor 704, memory 706, and interface devices 708 (1)-708(G). Processor 704 is connected to memory 706. Processor 704 is also connected to interface devices 708 (1)-708(G). These connections are direct or via other internal electronic circuitry or components.

Processor 704 is a programmable processor that executes instructions residing in memory 1306 to receive and send data via interface devices 708(1)-708(G). A programmable processor may be any programmable microprocessor or processor or combination of microprocessors or processors that can operate on digital data. According to one embodiment of the present invention processor 704 is an Intel microprocessor.

Memory 706 may be any machine-readable medium that stores data that is processed by processor 704. Machine-readable medium may be any computer program product, apparatus and/or device (e.g., a random access memory (RAM), read only memory (ROM), magnetic disc, optical disc, programmable logic device (PLD), tape, or any combination of these devices). This may include external machine-readable mediums that are connected to processor 704 via one or more interface devices 708(1)-708(G).

Interface devices 708 (1)-708(G) are interfaces that receive and/or send digital data to and from an external device. Interfaces may be any point of access to an external device where digital data is received or sent, including ports, buffers, queues, subsets thereof, or any other interface to an external device. Software deployment manager 108 may have administrator interface 302 connected via one or more of interface devices 708(1)-708(G). Administrator interface 302 may be a graphical user interface (GUI), a phone, or a personal data assistant. Such devices may comprise an output device that can provide to a user any form of sensory feedback such as voice, auditory or tactile (e.g., liquid crystal display (LCD), cathode ray tube (CRT), or earpiece) and an input device providing any form of input to the computer including acoustic, speech, or tactile input (e.g., keyboard, mouse, trackball, keypad).

Various implementations of the systems and techniques described here can be realized in any processing systems and/or digital electronic circuitry, integrated circuitry, specially designed ASICs (application specific integrated circuits), computer hardware, firmware, software, and/or combinations thereof.

A number of embodiments of the invention have been described. Nevertheless, it will be understood that various modifications may be made.

What is claimed is:

1. A method for deploying software on a local device comprising:

receiving a message from a software deployment system, said message having been transmitted to a plurality of discrete devices grouped in a first hierarchical level of multiple hierarchical levels according to a single execution process in a common generic format, wherein each hierarchical level has a parent-child relationship with its neighboring levels, responsive to said message, identifying a plurality of instructions from the message, a first instruction identifying, in said generic command format, a process step to be taken to deploy software, wherein the instructions include a plurality of sequentially dependent executable units;

converting said first instruction from said generic format to a command format compatible with an operating system of the local device;

executing an operating system command on the local device corresponding to a second instruction to deploy software on the local device;

when an executable unit fails, ceasing execution of subsequent executable units on the local device and identifying the failed executable unit;

when no executable unit fails, completing execution to deploy software on the local device;

obtaining status information pertaining to progress of the software deployment; and transmitting the status information to the software deployment system.

2. A method for deploying software on a local device comprising:

receiving a message, said message having been transmitted to a plurality of discrete devices grouped in a same hierarchical level of multiple hierarchical levels according to a single execution process in a first format, wherein each hierarchical level has a parent-child relationship with its neighboring levels, extracting instructions from said message, said instructions having said first format and including a plurality of sequentially dependant executable units;

converting said instructions from said first format to a second format, the second format being compatible with an operating system of the local device;

responsive to execution of a first of said converted instructions, retrieving a deployment program from storage;

responsive to execution of a second of said converted instructions, deploying software on the local device by running the deployment program;

when an executable unit fails, ceasing execution of subsequent executable units on the local device and identifying the failed executable unit;

when no executable unit fails, completing execution to deploy software on the local device;

obtaining status information pertaining to progress of the deployment program; and transmitting the status information to the software deployment system.

3. The method of claim 2, wherein said instructions are converted by retrieving said second format using a look-up table that is indexed using said first format.

4. The method of claim 3, wherein said look-up table is stored on said local device.

5. The method of claim 2, wherein said instructions are converted by identifying a look-up table that corresponds to a type of operating system in use at the local device.

6. The method of claim 2, further comprising the step of providing a status of execution.

7. The method of claim 6, wherein said status is provided by displaying said status to said user in a manner that does not interfere with use of said processor for purposes other than said software deployment.

8. The method of claim 6, further comprising providing a user an option to select a level of status that is provided.

9. The method of claim 6, wherein said status is provided by transmitting a software deployment message log to a software deployment manager.

10. A method for deploying software comprising:

transmitting software deployment messages from a common source to a plurality of heterogeneous and discrete computer systems grouped in a same hierarchical level of multiple hierarchical levels according to a single execution process in a common generic format, wherein each hierarchical level has a parent-child relationship with its neighboring levels;

at each of the computer systems:

extracting a plurality of instructions from the message, in the generic format, to deploy software, wherein the instructions include a plurality of sequentially dependent executable units;

converting instructions from the generic format within the message to a command format that is compatible with an operating system in use at the respective computer system;

performing at least one operating system command on the local device corresponding to one or more commands within the deployment messages on the respective computer system;

when an executable unit fails, ceasing execution of subsequent executable units on the local device and identifying the failed executable unit;

when no executable unit fails, completing execution to deploy software on the local device;

obtaining status information pertaining to progress of the software deployment; and creating at least one of a process level and task level deployment log message to keep track of status information, wherein the status information is persisted.

11. The method of claim 10, wherein said software deployment message is held while one of said computer systems is not available and is later transmitted when said one of said computer systems is available.

12. An arrangement for executing a software deployment comprising:

a first processor;

a first memory coupled to said first processor; and a software deployment manager residing in said first memory and executed by said first processor, said software deployment manager comprising:

a software deployment execution generator for executing a software deployment by generating a software deployment message to a plurality of discrete devices systems grouped in a same hierarchical level of multiple hierarchical levels according to a single execution process including a generic instruction, wherein each hierarchical level has a parent-child relationship with its neighboring levels; and a communications manager for transmitting the software deployment message to the plurality of discrete devices, wherein the software deployment message includes a plurality of sequentially dependent executable units, and receiving a software deployment log message providing a status of the software deployment, the status indicating completion of the software deployment when all executable units are executed and the status indicating incompletion of the software deployment when at least one executable unit fails ceasing execution of subsequent executable units.

13. The arrangement of claim 12, further comprising:

a second processor coupled to said first processor;

a second memory coupled to said second processor; and a software deployment service residing in the second memory and executed by the second processor, said software deployment service comprising:

a software deployer to execute instructions received from said first processor to deploy said software.

14. An arrangement for executing a software deployment comprising:

a first processor;

a first memory coupled to said first processor; and a client software deployment service residing in said first memory and executed by said first processor, said client software deployment service comprising:

a client process manager to manage execution of received instructions to deploy software, said instructions having been transmitted to a plurality of discrete devices systems grouped in a same hierarchical level of multiple hierarchical levels according to a single execution process in a common generic format, wherein each hierarchical level has a parent-child relationship with its neighboring levels;

a command handler to provide said client process manager with translations of instructions to deploy said software, wherein the instructions include a plurality of sequentially dependent executable units; and a process status manager for providing a status of deployment of said software, the status indicating completion of the software deployment when all executable units are executed and the status indicating incompletion of the software deployment when at least one executable unit fails ceasing execution of subsequent executable units.

15. The arrangement of claim 14, wherein said process status manager provides status of a software deployment via a tool bar icon or dialog box that does not interfere with use of said processor for purposes other than said software deployment.

16. The arrangement of claim 14, wherein said process status manager provides a user an option to chose a level of status that is provided.

17. The arrangement of claim 14, wherein said process status manager transmits a software deployment log message to a software deployment manager to provide said status.

18. The arrangement of claim 16, wherein said level is a task level or a process level.

19. The arrangement of claim 14, further comprising a state persistency manager to maintain said status using a state.

20. A computer readable medium storing thereon program instructions that, when executed, cause an executing device to:

receive, by a local device, a software deployment message having been transmitted to a plurality of discrete devices grouped in a same hierarchical level of multiple hierarchical levels according to a single execution process in a common generic format, wherein each hierarchical level has a parent-child relationship with its neighboring levels, extract a first instruction and a second instruction from said message to deploy software received by a local device, the instructions identifying, in said generic format, wherein the second instruction includes a plurality of sequentially dependent executable units;

convert said first instruction from said generic format to a command format compatible with an operating system of the local device; and executing an operating system command on the local device corresponding to the second instruction to deploy software on the local device,
when an executable unit fails, ceasing execution of subsequent executable units on the local device and identifying the failed executable unit,
when no executable unit fails, completing execution to deploy software on the local device.

21. A computer readable storage medium storing thereon program instructions that, when executed, cause an executing device to:

receive, by a local device, a message having been transmitted to a plurality of discrete devices grouped in a same hierarchical level of multiple hierarchical levels according to a single execution process in a first format, wherein each hierarchical level has a parent-child relationship with its neighboring levels, extract instructions from said message, said instructions having said first format, wherein the instructions includes a plurality of sequentially dependent executable units;

convert said instructions from said first format to a second format, the second format being compatible with an operating system of the local device;

responsive to execution of a first of said converted instructions, retrieve a deployment program from storage; and responsive to execution of a second of said converted instructions, deploy software on the local device by running the deployment program,
when an executable unit fails, ceasing execution of subsequent executable units on the local device and identifying the failed executable unit,
when no executable unit fails, completing execution to deploy software on the local device.

22. The computer readable storage medium of claim 21, wherein said instruction is converted by retrieving said second format using a look-up table that is indexed using said first format.

23. The computer readable storage medium of claim 22, wherein said look-up table is stored on said local device.

24. The computer readable storage medium of claim 21, wherein said instruction is converted by identifying a look-up table that corresponds to a type, said type being defined by the operating system of said local device.

25. The computer readable storage medium of claim 21, further comprising the step of providing a status of execution.

26. The computer readable storage medium of claim 22, wherein said status is provided by displaying said status to said user in a manner that does not interfere with use of said processor for purposes other than said software deployment.

27. The computer readable storage medium of claim 22, further comprising instructions that cause the executing device to provide a user an option to select a level of status that is provided.

28. The computer readable storage medium of claim 21, wherein said status is provided by transmitting a software deployment message to a software deployment manager.

29. A computer readable storage medium storing thereon program instructions that, when executed, cause an executing device to:

transmit software deployment messages from a common source to a plurality of heterogeneous and discrete computer systems grouped in a same hierarchical level of multiple hierarchical levels according to a single execution process in a common generic format, wherein each hierarchical level has a parent-child relationship with its neighboring levels;

at each of the computer systems:
extracting a plurality of instructions from the message, in the generic format, to deploy software, wherein the instructions include a plurality of sequentially dependent executable units;
convert instructions from the generic format within the message to a command format that is compatible with an operating system in use at the respective computer system;
performing at least one operating system command on the local device corresponding to one or more commands within the deployment messages on the respective computer system;
when an executable unit fails, ceasing execution of subsequent executable units on the local device and identifying the failed executable unit;

when no executable unit fails, completing execution to deploy software on the local device;

obtaining status information pertaining to progress of the software deployment; and creating at least one of a process level and task level deployment log message to keep track of status information, wherein the status information is persisted.

30. The computer readable storage medium of claim 29, wherein said software deployment message is held while one of said computer systems is not available and is later transmitted when said one of said computer systems is available.

31. A method for deploying software on a local device comprising:

receiving a message from a software deployment system, said message having been transmitted to a plurality of discrete devices grouped in a same hierarchical level of multiple hierarchical levels according to a single execution process in a common generic format, wherein each hierarchical level has a parent-child relationship with its neighboring levels, responsive to the message, identifying a plurality of instructions, each in said generic format, that identify process steps to be taken to deploy software, wherein the instructions include a plurality of sequentially dependent executable units;

converting each instruction of the message from said generic format to a command format compatible with an operating system of the local device; and performing operating system commands on the local device corresponding to the converted instructions, wherein the operating system commands cause new software to be deployed on the local device;

when an executable unit fails, ceasing execution of subsequent executable units on the local device and identifying the failed executable unit;

when no executable unit fails, completing execution to deploy software on the local device.

32. The method of claim 1, further comprising:

creating a deployment log message to keep track of status information associated with deploying software, wherein the status information is persisted and readily made available for notification if an execution of the process step fails.

33. The method of claim 32, wherein the log message further comprises at least one of a task level message and a process level message.

34. The arrangement for executing a software deployment in claim 12, wherein the software deployment message provides executable units that will be processed to deploy software and parameters of the executable units.

35. The method of claim 1, wherein software deployment message is also transmitted to at least one device in a second hierarchical level, wherein the second hierarchical level is a child of the first hierarchical level.

* * * * *